(12) United States Patent
Zhang et al.

(10) Patent No.: US 6,282,699 B1
(45) Date of Patent: Aug. 28, 2001

(54) CODE NODE FOR A GRAPHICAL PROGRAMMING SYSTEM WHICH INVOKES EXECUTION OF TEXTUAL CODE

(75) Inventors: Roger Zhang; Robert Dye; Greg McKaskle; Chris Cifra, all of Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/256,806

(22) Filed: Feb. 23, 1999

(51) Int. Cl.$^7$ .................................................. G06F 9/45
(52) U.S. Cl. ................................. 717/2; 345/967
(58) Field of Search .......................... 717/1, 2; 345/333, 345/334, 335, 348, 349, 967

(56) References Cited

U.S. PATENT DOCUMENTS

| | | | | |
|---|---|---|---|---|
| 4,901,221 | * | 2/1990 | Kodosky et al. | 395/348 |
| 5,481,741 | * | 1/1996 | McKaskle et al. | 395/800 |
| 5,760,788 | * | 6/1998 | Chainini et al. | 345/474 |
| 5,790,863 | * | 8/1998 | Simonyi | 395/707 |
| 6,064,812 | * | 5/2000 | Parthasarathy et al. | 395/701 |
| 6,113,649 | * | 9/2000 | Govindaraj | 717/2 |
| 6,131,184 | * | 10/2000 | Weeren et al. | 717/2 |
| 6,154,875 | * | 11/2000 | Tanaka et al. | 717/2 |
| 6,173,438 | * | 1/2001 | Kodosky et al. | 717/1 |
| 6,182,278 | * | 1/2001 | Hamada et al. | 717/2 |

OTHER PUBLICATIONS

Golin, "Palette: An extensible visual editor", ACM, 1992, pp 1208–1216.*

Roman et al., "Program visualization : The art of mapping programs to pictures", ACM, 1992, pp 412–420.*

Hiranandani et al., "The D editor: A new interactive parallel programming tool", IEEE, 1994, pp 733–742.*

Kopache et al., "C : A mixed textual/graphical environment for C", IEEE, 1998, pp 231–238.*

Matrix and expression support broaden simulation applications, Personal Engineering, Jun. 1997, pp 19–21.

LabVIEW for Windows User Manual, Aug. 1993 Edition, pp 14–1 thru 14–8.

LabVIEW Code Interface Reference Manual, Aug. 1993 Edition, pp. 1–1 thru 1–23, 2–1 thru 2–28, 3–1 thru 3–22.

* cited by examiner

*Primary Examiner*—Kakali Chaki
(74) *Attorney, Agent, or Firm*—Conley, Rose & Tayon PC; Jeffrey C. Hood

(57) ABSTRACT

A system and method for creating a graphical program, wherein the graphical program is operable to invoke execution of textual code. The user selects a code node for inclusion in the graphical program, wherein the code node is displayed on the screen. The user then selects or enters textual code that is comprised in or displayed in the code node. The textual code may be code from a text-based language, such as Perl, Mathematica, or Java, etc., or may be a script from a scripting language. The user may manually enter the textual code into the code node, or import the textual code from a file. The textual code comprised in the code node is user viewable and editable. During execution of the graphical program, the code node is operable to invoke execution of the textual code comprised in the code node. The textual code is preferably executed by an instance of a server program. During execution of the graphical program, the graphical programming system provides the textual code to the server program, as well as any input data received by the code node. The server program then executes the textual code, using any input data received by the code node, and produces an output which is provided back to the graphical program. The present invention thus enables a user of a graphical programming system to more easily incorporate, view, edit and debug textual based code from within the graphical programming system.

28 Claims, 15 Drawing Sheets

Microfiche Appendix Included
(2 Microfiche, 86 Pages)

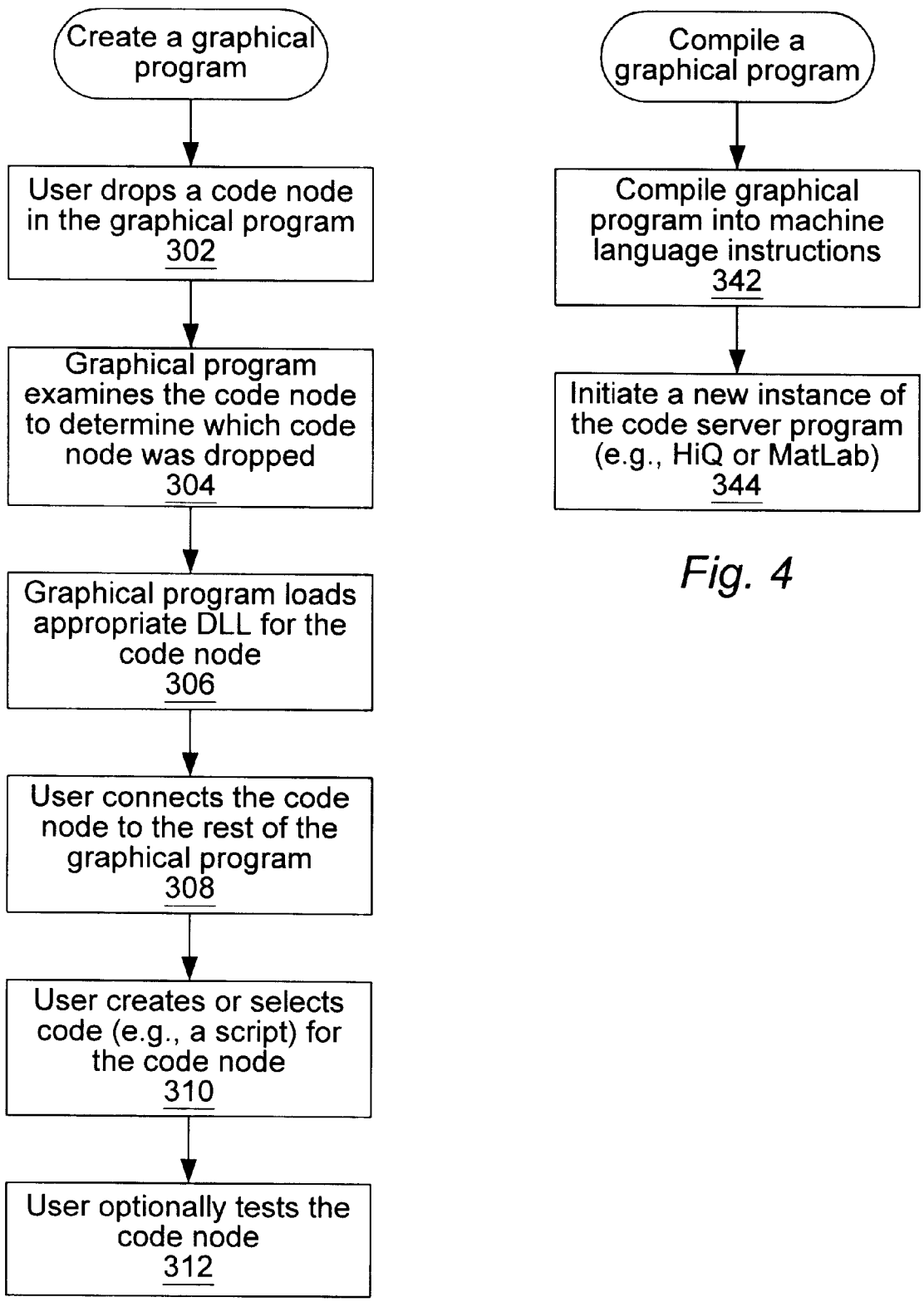

HiQ and MATLAB Datatypes in LabVIEW

| LabVIEW Datatype | HiQ Datatype | MATLAB Datatype |
|---|---|---|
| [I32] | Integer | N/A |
| [DBL] | Real | Real |
| [abc] | Text | N/A |
| [[I32]] | Integer Vector | N/A |
| [[DBL]] | Real Vector | Real Vector |
| [[I32]] | Integer Matrix | N/A |
| [[DBL]] | Real Matrix | Real Matrix |
| [CDB] | Complex | Complex |
| [CDB] | Complex Vector | Complex Vector |
| [CDB] | Complex Matrix | Complex Matrix |

*Fig. 15*

CODE NODE FOR A GRAPHICAL PROGRAMMING SYSTEM WHICH INVOKES EXECUTION OF TEXTUAL CODE

MICROFICHE APPENDIX

The present disclosure includes a microfiche appendix comprising 2 microfiche and 86 frames. The microfiche appendix comprises appendix A, which contains source code listings of one embodiment of the present invention.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to graphical programming, and in particular to a system for creating and executing graphical programs including a code node, wherein the code node in the graphical program contains textural source code which is viewable and editable by a user and is executed during execution of the graphical program.

DESCRIPTION OF THE RELATED ART

Traditionally, high level text-based programming languages have been used by programmers in writing applications programs. Many different high level programming languages exist, including Perl, Mathematica, Java, Basic, C, C++, Fortran, Pascal, Cobol, ADA, APL, etc. Programs written in these high level languages are translated to the machine language level by translators known as compilers. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he/she can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, and industrial automation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, Fortran, Basic, Pascal, Perl, Mathematica, or Java. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. No. 4,901,221 to Kodosky et al discloses a graphical system and method for modeling a process, i.e., a graphical programming environment, which enables a user to easily and intuitively model a process. The graphical programming environment disclosed in Kodosky et al can be considered the highest and most intuitive way in which to interact with a computer. A graphically based programming environment can be represented at level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. After the user constructs a data flow diagram or graphical program using the block diagram editor, machine language instructions are automatically constructed which characterize an execution procedure which corresponds to the displayed procedure. Therefore, a user can create a computer program solely by using a graphically based programming environment. This graphically based programming environment may be used for creating virtual instrumentation systems, industrial automation systems and modeling processes, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, is referred to as a virtual instrument (VI). In creating a virtual instrument, a user preferably creates a graphical user interface, e.g., a front panel or user interface panel. The graphical user interface (GUI) includes various front panel objects, such as controls or indicators that represent the respective input and output that will be used by the graphical program or VI, and may include other icons which represent devices being controlled. When the controls and indicators are created in the GUI or front panel, corresponding icons or terminals are automatically created in the block diagram by the block diagram editor. Alternatively, the user can first place terminal icons in the block diagram which cause the display of corresponding front panel objects in the GUI or front panel. The user then chooses various functions that accomplish his desired result, connecting the corresponding function icons between the terminals of the respective controls and indicators. In other words, the user creates a data flow program, referred to as a block diagram, representing the graphical data flow which accomplishes his desired function. This is done by wiring up the various function icons between the control icons and indicator icons. The manipulation and organization of icons in turn produces machine language that accomplishes the desired method or process as shown in the block diagram.

A user inputs data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user adjusts the controls on the front panel to affect the input and views the output on the respective indicators.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), and supervisory control and data acquisition (SCADA) applications, among others.

It is desirable for a program, such as a graphical program, to be able to access functionality provided by a text based program, such as a program written in C, C++, Basic, Pascal, Fortran, Cobol, or a scripting language, among others. It is further desirable to enable a user to be able to create, view and/or edit textual code in a graphical program. Therefore, improved methods are desired for enabling a graphical data flow programming system to incorporate or invoke text code programs, including scripts.

Prior versions of LabVIEW included a code interface node (CIN). The CIN is a block diagram node associated with a section of source code written in a conventional programming language, i.e., text code. The user compiled the source code first and linked it to form executable code. A LabVEEW VI then called the executable code when the CIN node executed, passing input data from the block diagram to the executable code and returning data from the executable code to the block diagram. The code interface node could only be used to invoke execution of executable code. Further, a code interface node in a graphical program could not be used to directly view or edit the code which was called by the code interface node.

Prior versions of LabVIEW also included a formula node. The user could input a formula into the formula node, and during executing of the graphical program, execution of the formula node resulted in execution of the formula contained within the formula node.

SUMMARY OF THE INVENTION

The present invention comprises a computer system and method for creating a graphical program, wherein the graphical program is operable to incorporate textual code and is operable to invoke execution of textual code. The method for creating the graphical program operates in a computer including a display screen and a user input device.

The method for creating the graphical program includes the user selecting a code node for inclusion in the graphical program, wherein the code node is displayed on the screen. The user then selects or enters textual code that is comprised in or displayed in the code node. The textual code may be code from a text-based language, such as Perl, Mathematica, or Java, or may be code such as C, C++, Pascal, Fortran, Cobol, etc., or may be a script from a scripting language. The user may manually enter the textual code into the code node, or import the textual code from a file. The textual code comprised in the code node is user editable. In creating the graphical program, the user arranges a plurality of nodes on the screen, including the code node, preferably by connecting the nodes in a data flow format. During execution of the graphical program, the code node is operable to invoke execution of the textual code comprised in the code node.

In the preferred embodiment, the textual code is executed by an instance of a server program. In one embodiment, the user selects a particular code node depending on the type of textual code and the corresponding server program required, and the server program is selected based on the type of the code node. During execution of the graphical program, the graphical programming system provides the textual code to the server program. If the code node is connected to receive inputs from one or more nodes in the graphical program, the graphical programming system also provides this input data to the server program. The server program then executes the textual code, using any input data received by the code node, and produces an output. The server program provides this output to the graphical program, and the output is used during subsequent execution of the graphical program. For example, if the code node is connected to provide an output to one or more other nodes, the output produced by the server program is provided to these one or more other nodes. Upon completion of the graphical program, the instance of the server program is released.

The present invention thus enables a user of a graphical programming system to more easily incorporate, view, edit, debug and invoke textual based code from within the graphical programming system.

BRIEF DESCRIPTION OF THE DRAWINGS

A better understanding of the present invention can be obtained when the following detailed description of the preferred embodiment is considered in conjunction with the following drawings, in which:

FIG. 3 is a flowchart diagram illustrating creation of a graphical program including a code node according to the present invention;

FIG. 4 is a flowchart diagram illustrating compilation of the graphical program created in FIG. 3;

FIG. 15 is a table illustrating correspondence of data types between LabVEEW, HiQ and MatLab.

Figure 1:
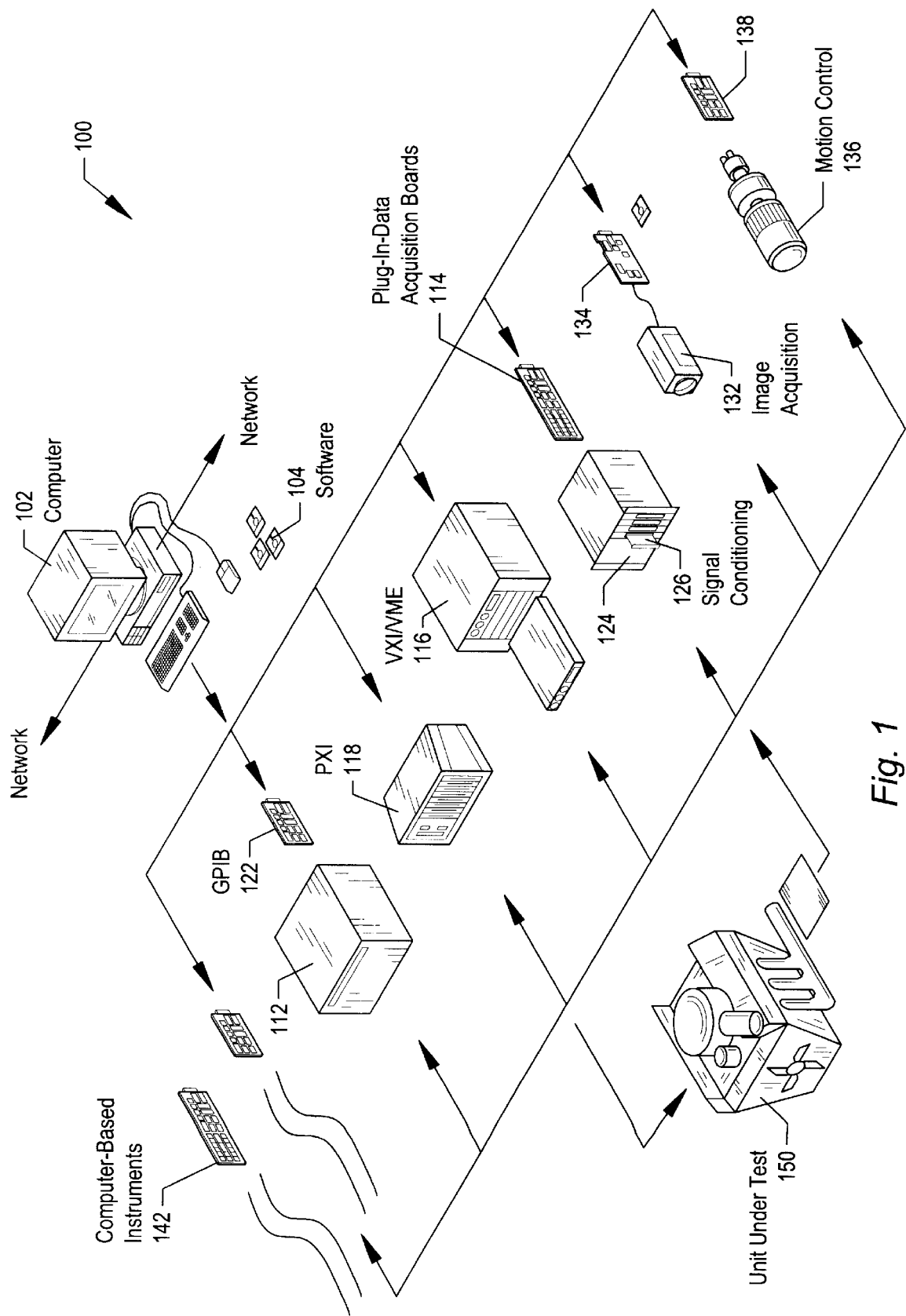
FIG. 1 illustrates an instrumentation control system according to one embodiment of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following U.S. Patents and patent applications are hereby incorporated by reference in their entirety as though fully and completely set forth herein.

U.S. Pat. No. 4,901,221 titled "Graphical System for Modeling a Process and Associated Method," issued on Feb. 13, 1990.

U.S. Pat. No. 5,481,741 titled "Method and Apparatus for Providing Attribute Nodes in a Graphical Data Flow Environment".

The LabVIEW and BridgeVIEW graphical programming manuals and help files, including the "G Programming Reference Manual", available from National Instruments Corporation, are also hereby incorporated by reference in their entirety.

Figure 1A:
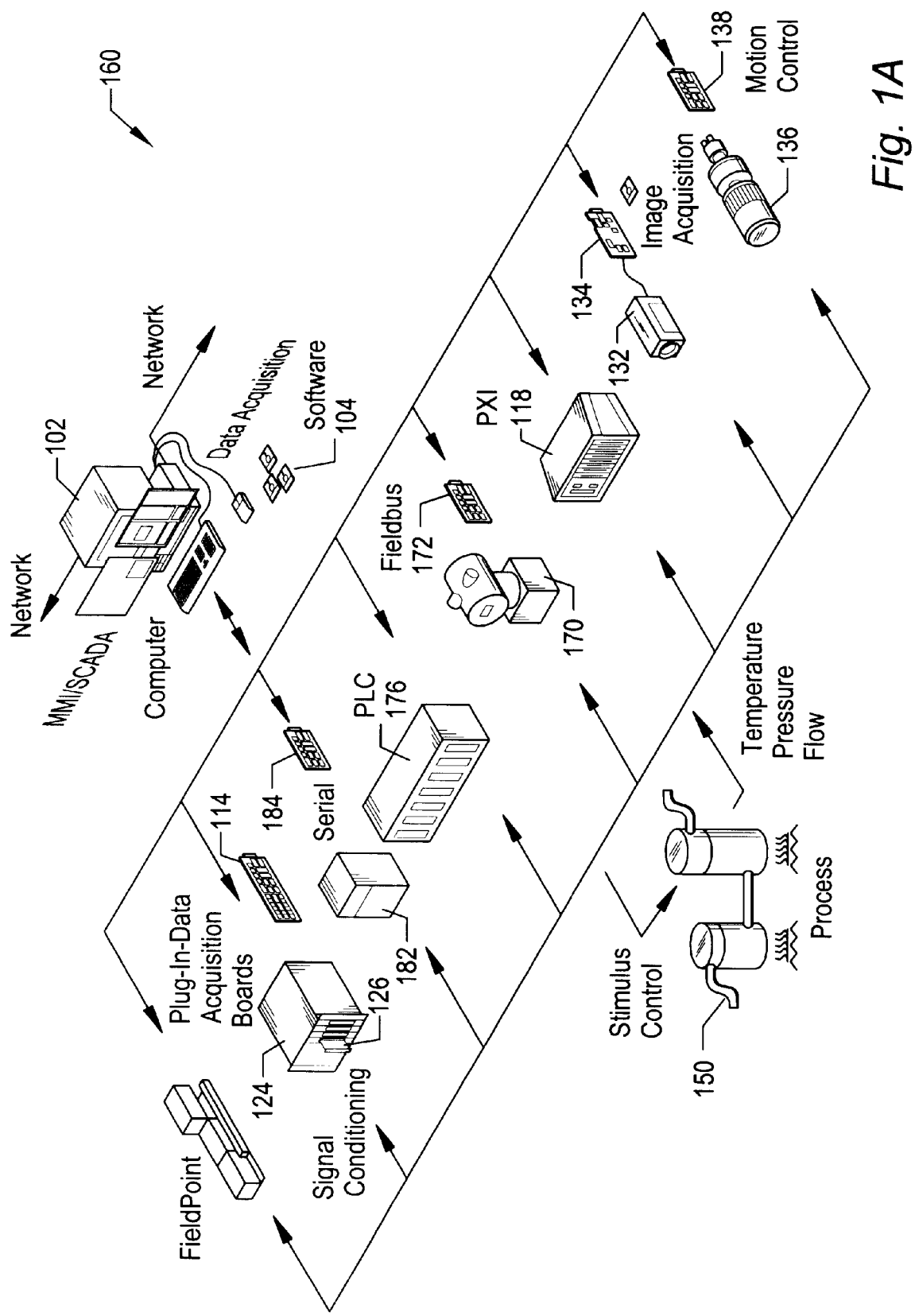
FIG. 1A illustrates an industrial automation system according to one embodiment of the present invention.

FIGS. 1 and 1A—Instrumentation and Industrial Automation Systems

FIGS. 1 and 1A illustrate example systems where the present invention may be used. The present invention may of course be used in other types of systems as desired.

FIG. 1 illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPEB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and preferably interfaces through signal conditioning circuitry 124 to the UUT. The signal conditioning circuitry 124 preferably comprises an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1A illustrates an industrial automation system 160. The industrial automation system 160 is similar to the instrumentation or test and measurement system 100 shown in FIG. 1. Elements which are similar or identical to elements in FIG. 1 have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150. Referring again to FIGS. 1 and 1A, the computer system 102 preferably includes a memory media on which computer programs according to the present invention are stored. The term "memory media" is intended to include an installation media, e.g., a CD-ROM, or floppy disks 104, a computer system memory such as DRAM, SRAM, EDO RAM, etc., or a non-volatile memory such as a magnetic media, e.g., a hard drive, or optical storage. The memory media preferably stores a graphical programming development system for developing and executing graphical programs. The created graphical programs may include one or more code nodes, also called script nodes, which are operable to view, edit and invoke execution of code, such as text code, e.g., a script. The host CPU executing code and data from the memory comprises a means for creating and executing graphical programs according to the methods described below.

The instruments or devices in FIGS. 1 and 1A are controlled by graphical software programs. Graphical software programs which perform data acquisition, analysis and/or presentation, e.g., for instrumentation control or industrial automation, are referred to as virtual instruments.

In the preferred embodiment, the present invention utilizes the LabVIEW or BridgeVIEW graphical programming systems, hereafter collectively referred to as LabVIEW, available from National Instruments. Also, in the preferred embodiment, the term "LabVIEW" is intended to include graphical programming systems which include G programming functionality, i.e., which include at least a portion of LabVIEW graphical programming functionality, including the BridgeVIEW graphical programing system.

Also, the term "graphical programming system" is intended to include any of various types of systems which are used to develop or create graphical code or graphical programs, including LabVIEW and BridgeVIEW from National Instruments, Visual Designer from Intelligent Instrumentation, Hewlett-Packard's VEE (Visual Engineering Environment), Snap-Master by HEM Data Corporation, DASYLab by DasyTec, GFS DiaDem, and GEDAE, among others.

Although in the preferred embodiment the graphical programming system is involved with data acquisition/generation, analysis, and/or display, and for controlling or modeling instrumentation or industrial automation hardware, it is noted that the present invention can be used for a plethora of applications and is not limited to instrumentation or industrial automation applications. In other words, FIGS. 1 and 1A are exemplary only, and the present invention may be used in any of various types of systems. Thus, the system and method of the present invention is operable for creating graphical programs or graphical code for any of various types of applications, including general purpose software applications such as word processing, spreadsheets, network control, games, etc.

Figure 2:
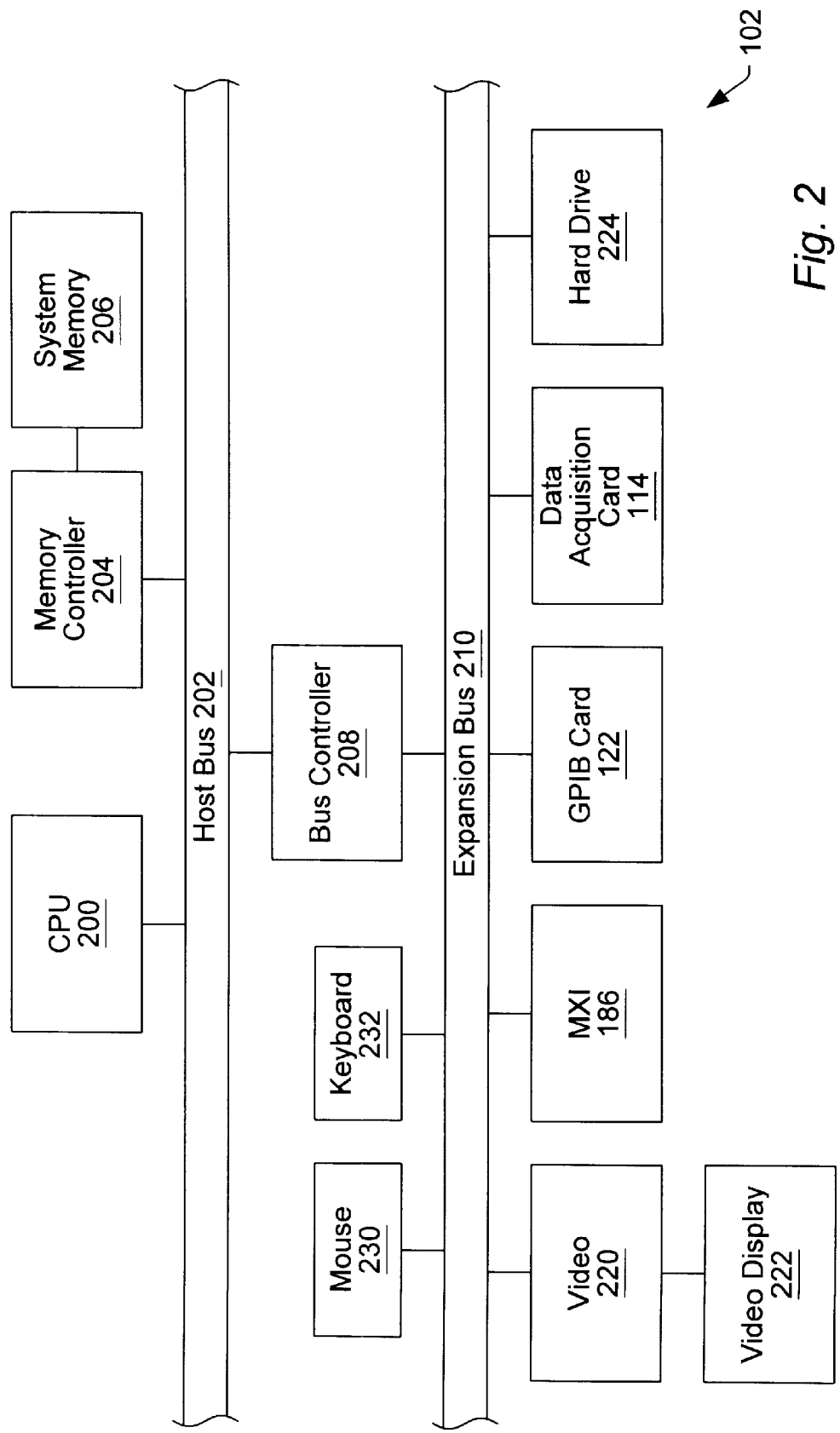
FIG. 2 is a block diagram of the computer of the control system of FIG. 1.

FIG. 2—Computer Block Diagram

FIG. 2 is a representative block diagram of the host computer 102 (of FIG. 1). It is noted that the block diagram of FIG. 2 is representative only, and the computer 102 may have any of various architectures. Also, the elements of a computer not necessary to understand the operation of the present invention have been omitted for simplicity.

The computer 102 includes at least one central processing unit or CPU 200 which is coupled to a processor or host bus 202. The CPU 200 may be any of various types, including an x86 processor, a PowerPC processor, a CPU from the Motorola family of processors, a CPU from the SPARC family of RISC processors, as well as others. Main memory 206 is coupled to the host bus 202 by means of memory controller 204. The main memory 206 stores a graphical programming system. The main memory 206 also stores operating system software as well as other software for operation of the computer system, as well known to those skilled in the art. The instrumentation control software will be discussed in more detail below.

The host bus 202 is coupled to an expansion or input/output bus 210 by means of a bus controller 208 or bus bridge logic. The expansion bus 210 is preferably the PCI Peripheral Component Interconnect) expansion bus, although other bus types can be used. The expansion bus 210 includes slots for various devices such as the data acquisition board 114 (of FIG. 1), the GPIB interface card 122 which provides a GPIB bus interface for coupling to the GPIB instrument 112 (of FIG. 1), and a VXI or MXI bus card 186 for coupling to the VXI chassis 116 for receiving VXI instruments.

The computer 102 firdier preferably comprises a video display subsystem 220 which interfaces to video monitor 222, and a non-volatile memory such as hard drive 224, each preferably coupled to the expansion bus 210. The computer 102 further preferably comprises various input devices, such as mouse 230 and keyboard 232, as shown. The input devices are shown coupled to the expansion bus 210, but may be connected to the computer in any of various ways, such as a USB port (not shown). The computer 102 further preferably comprises various other standard components, as is well known in the art.

Graphical Programming System

As noted above, in the preferred embodiment the present invention utilizes the LabVIEW graphical programming system. A graphical program created using LabVIEW may comprise an instrument front panel in a first window and a block diagram in a second window. The block diagram comprises program execution elements, referred to as nodes, which are wired or linked together to produce a data flow program. The front panel comprises controls for providing input data to the block diagram and indicators for receiving and/or displaying output data from the nodes of the block diagram. Certain drawings in the present disclosure comprise screen shots displayed during the execution of LabVIEW according to the present invention.

In the preferred embodiment, a programmer employs a front panel editor, a block diagram editor, and optionally a connector pane/icon editor of a graphical programming environment to produce the graphical program. In the instrumentation application of the preferred embodiment, the graphical program is referred to as a virtual instrument (VI). The block diagram editor generates executable instructions, i.e., machine language instructions, in response to the VI. The VI developed by the programmer is executed by an execution subsystem of the graphical programming environment to control an instrument. The instrument is illustrative of instruments such as those of FIGS. 1 and 1A.

Figure 5:
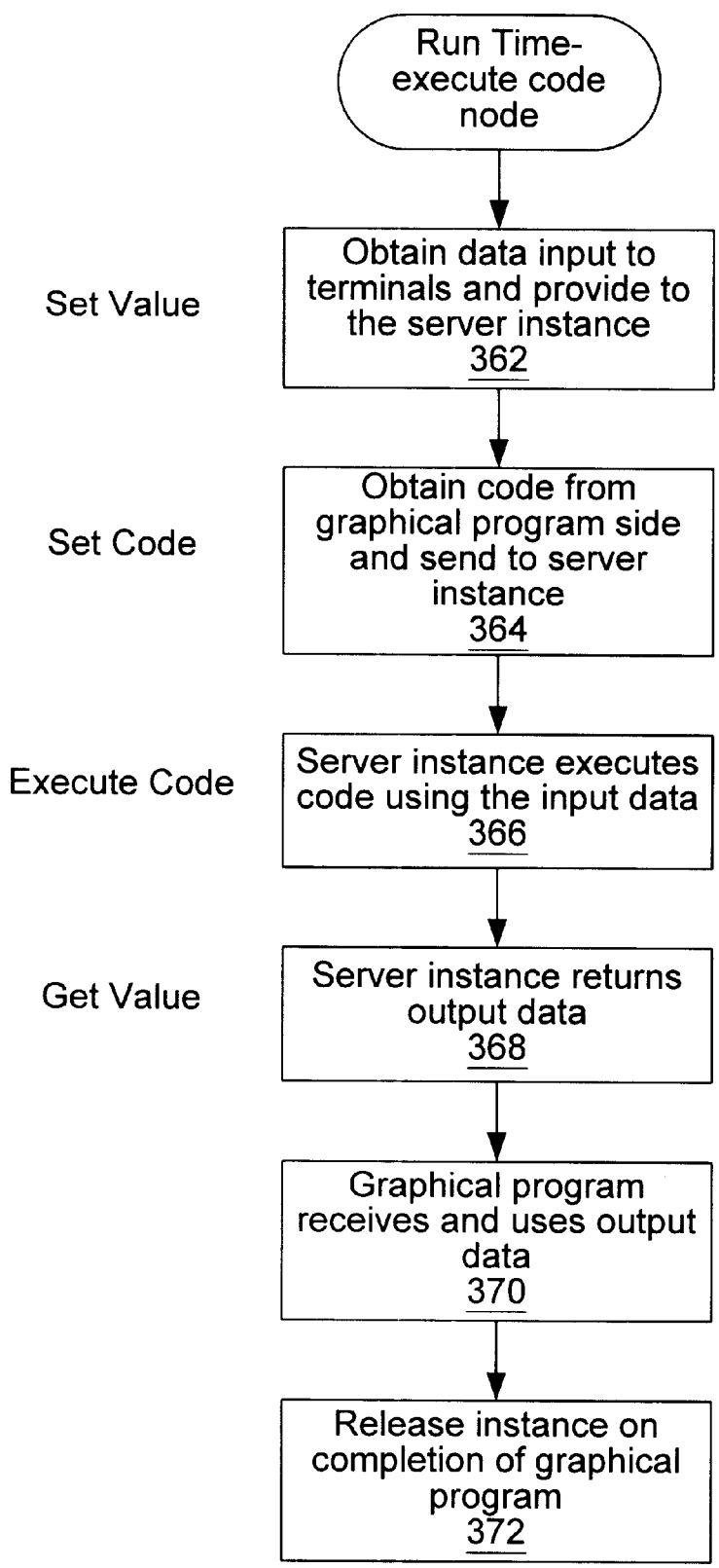
FIG. 5 is a flowchart diagram illustrating execution of the graphical program created in FIG. 3 and compiled in FIG. 4, wherein the code node operates to access and execute external code.

FIGS. 3–5: Creation and Execution of a Graphical Program Including a Code Node

FIG. 3 is a flowchart diagram illustrating creation of a graphical program including a code node according to the preferred embodiment. It is noted that various of the steps in the flowcharts of FIGS. 3–5 can be performed concurrently or in different orders. The present invention includes the use of a function node, referred to as a "code node", which is operable to invoke execution of code comprised within the code node. Where the code node is used to invoke execution of a script, the code node is referred to as a script node. Thus a script node is a particular example of a code node that is used for creating and/or invoking execution of a script from a scripting language.

Figure 8:
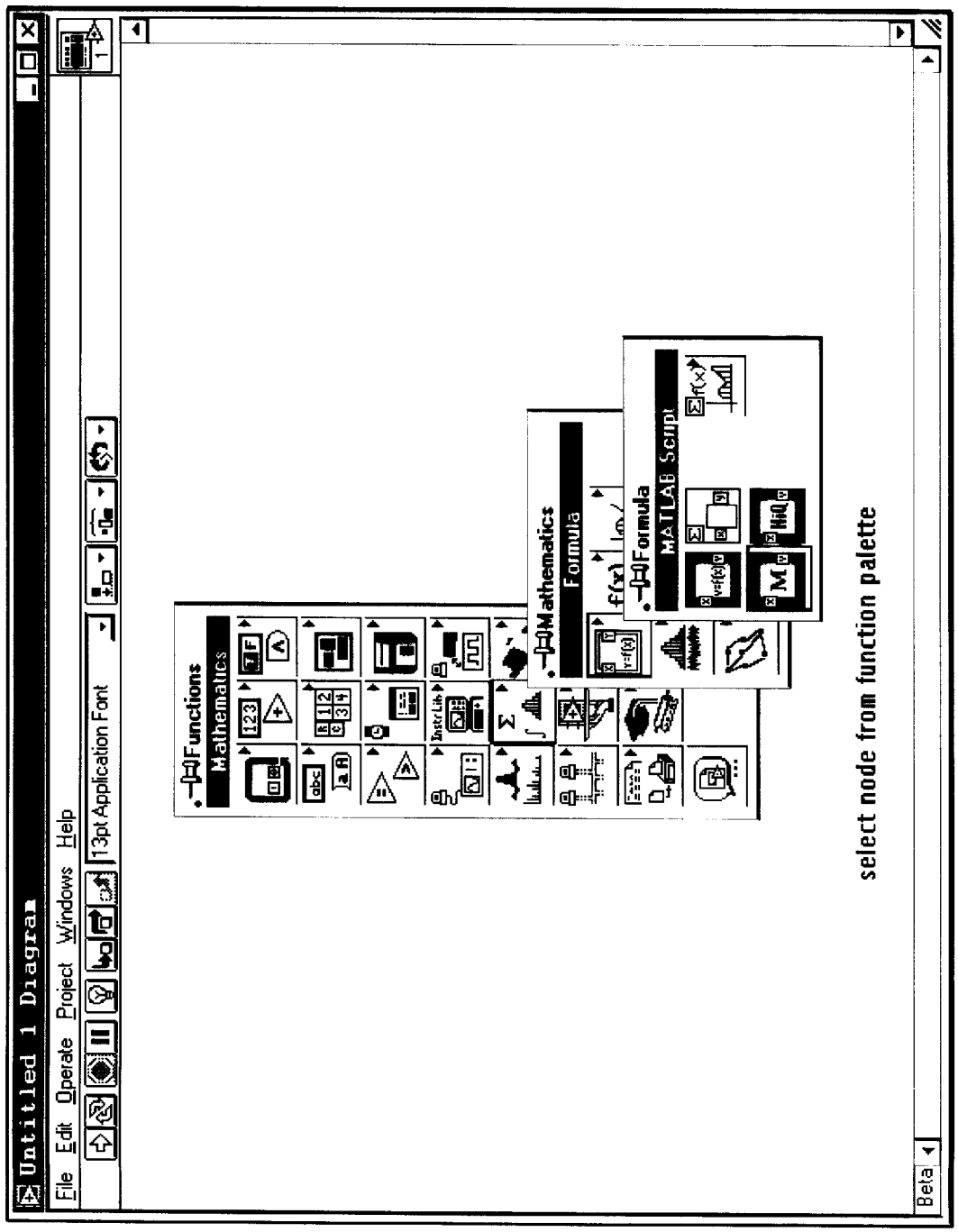
FIG. 8 is a screen shot illustrating the user selecting a MatLab script node from the function palette of the graphical programming system.
Figure 9:
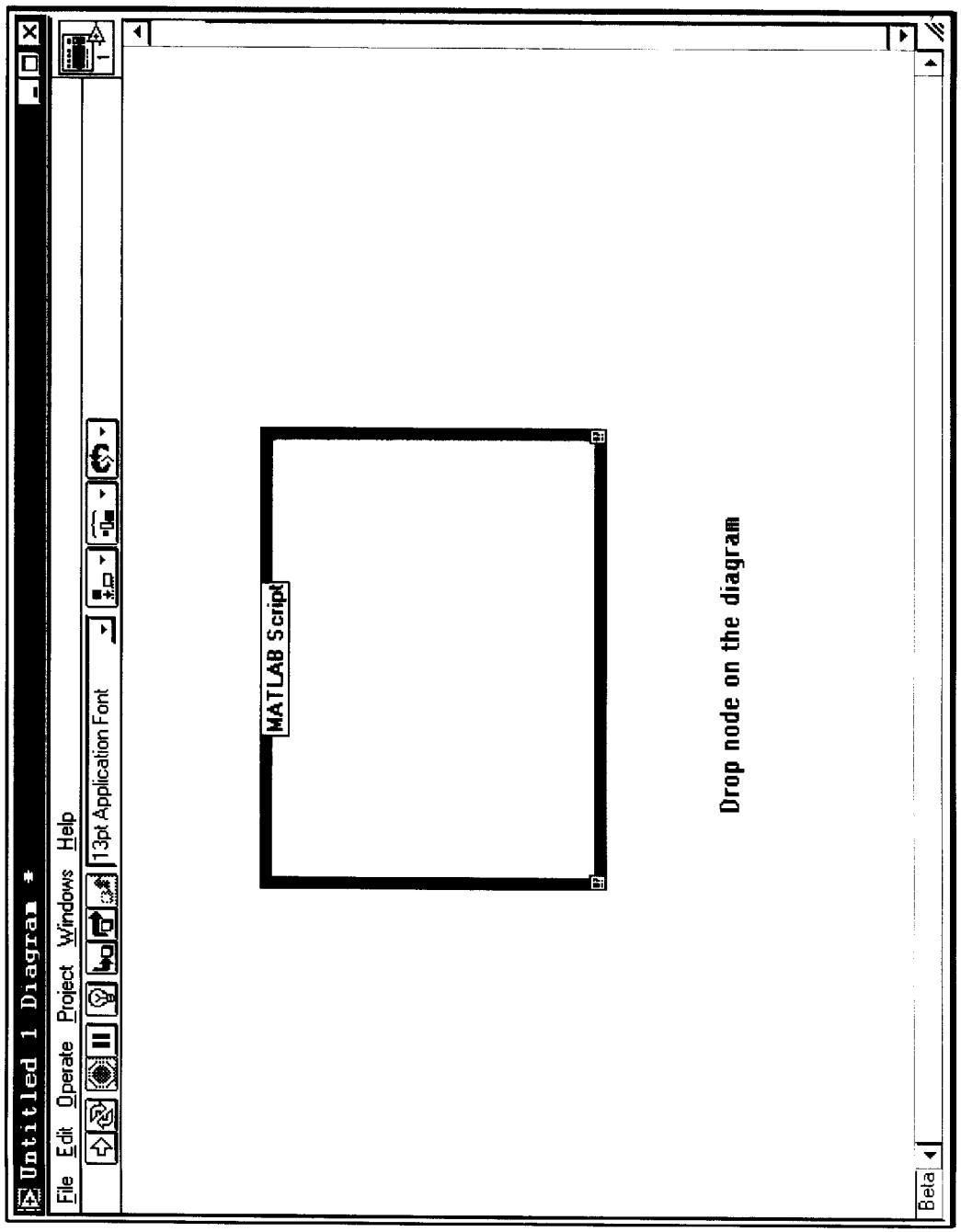
FIG. 9 is a screen shot illustrating the MatLab script node placed on the block diagram.

As shown, during creation of the graphical program, in step 302 the user operates to place a code node in the graphical program. Stated another way, during program creation the computer system displays on the screen a code node in the graphical program in response to user input. In the preferred embodiment, the user drags the code node from a palette onto the graphical program window. FIG. 8 is a screen shot illustrating the user selecting a MatLab script node from the function palette of the graphical programming system. FIG. 9 is a screen shot illustrating the MatLab script node placed on the block diagram.

The code node may be for referencing external code of various types, such as Perl, Mathematica, or Java code, or C, C++, Basic, Pascal, Fortran, or Cobol source code, among others. In the current embodiment, the code node is used for executing scripts from either the MatLab or HiQ programs. In this embodiment, the code node is referred to as a script node. Also, in this embodiment, the script node may be one of a HiQ script node or a MatLab script node.

In step 304 the graphical programming system examines the code node to determine which type of code node was dropped. In the preferred embodiment, the graphical programming system examines a string associated with or comprised in a code node to determine the type of code node that was dropped. In an alternate embodiment, the graphical programming system includes a single type of code node, and the user selects the desired server program for the code node.

In step 306 the graphical program programming system loads an appropriate dynamic linked library (DLL) for the code node, based on the determination performed in step 304. The DLL is used for interfacing between the code node and the respective server program which actually executes the textual code. Thus, if the code node is a HiQ script node, the graphical programming system loads the DLL corresponding to HiQ. If the code node is a MatLab script node, the graphical programming system loads a Mat Lab DLL of the script node. The operation of the DLL is discussed further below.

In step 308 the user connects the code node to the rest of the graphical program. In step 308 the user may arrange the graphical program on the screen, including the code node. The graphical program will typically comprise a plurality of nodes, and the method for creating the graphical program preferably comprises arranging on the screen the plurality of nodes, including the code node, and connecting the various nodes to create the graphical program. In the preferred embodiment, the nodes are connected in a data flow paradigm, wherein nodes include inputs and outputs, and each node receives input data from another node, or from an input user interface node or terminal, and each node provides output data to another node, or to an output user interface node or terminal. In the preferred embodiment, the user right clicks or "pops up" on the code node to add inputs and/or outputs to the code node for connecting to other nodes in the graphical program.

Figure 10:
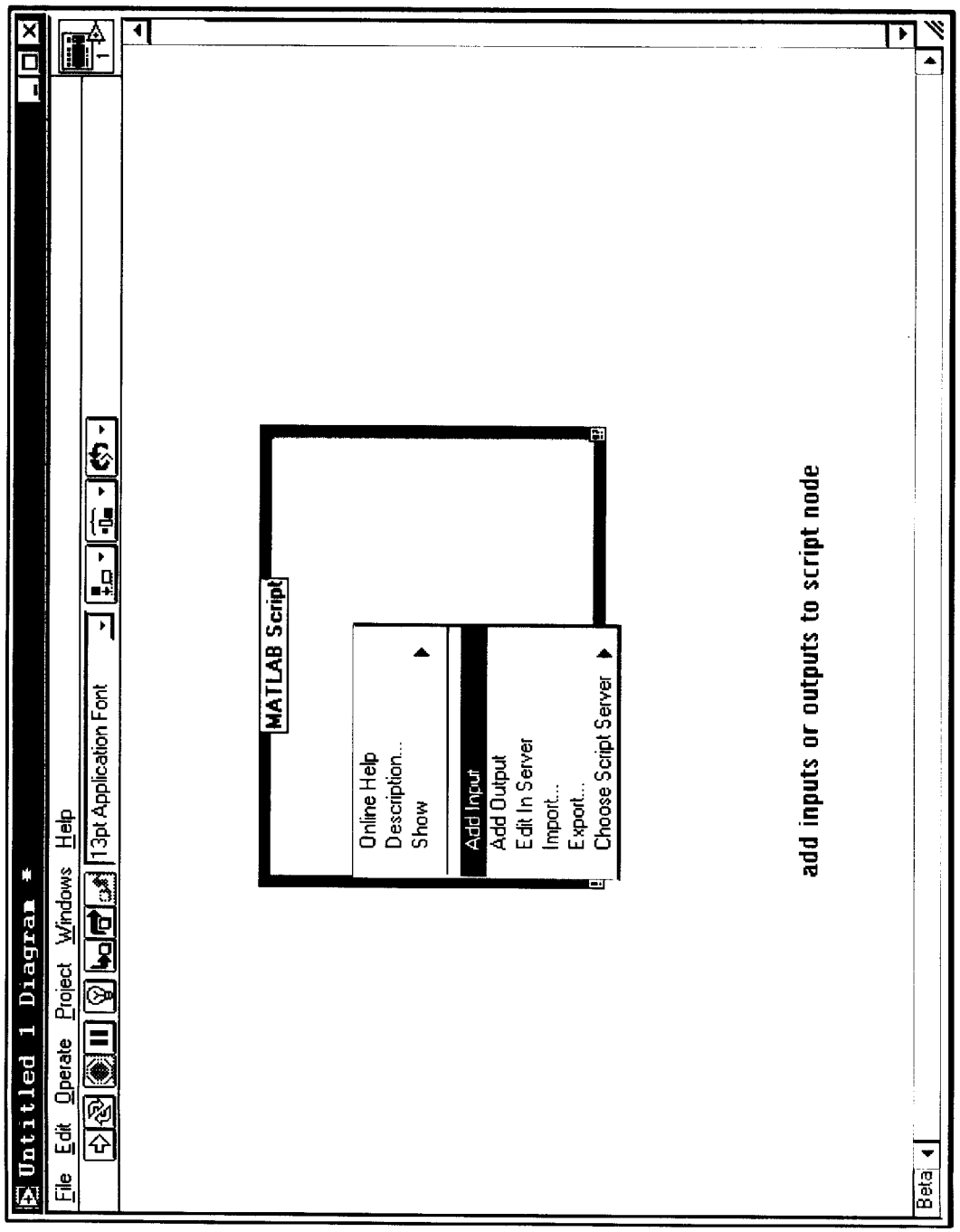
FIG. 10 is a screen shot illustrating the user adding inputs and/or outputs to the script node.
Figure 11:
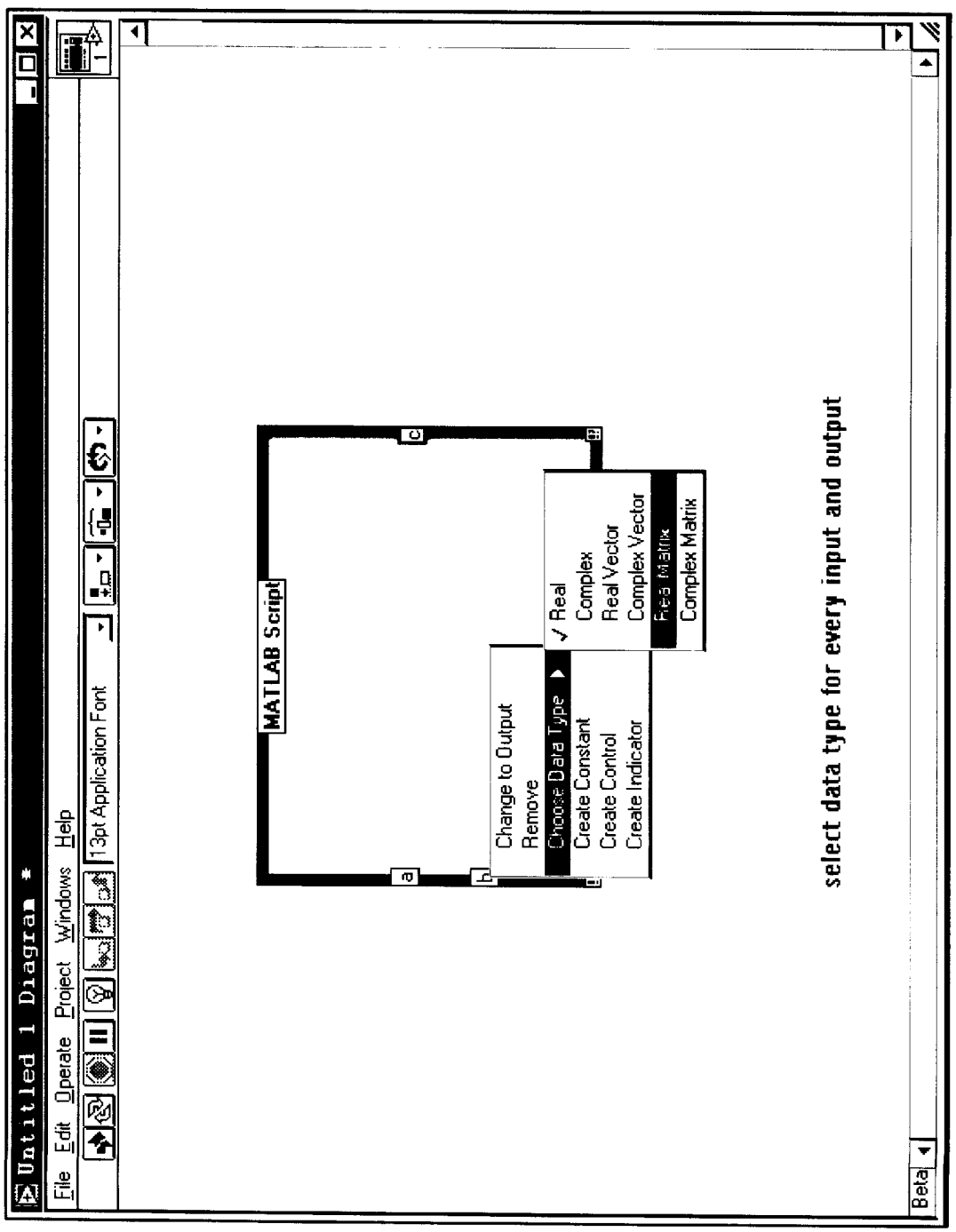
FIG. 11 is a screen shot illustrating the user selecting a data type for inputs and/or outputs of the script node.
Figure 12:
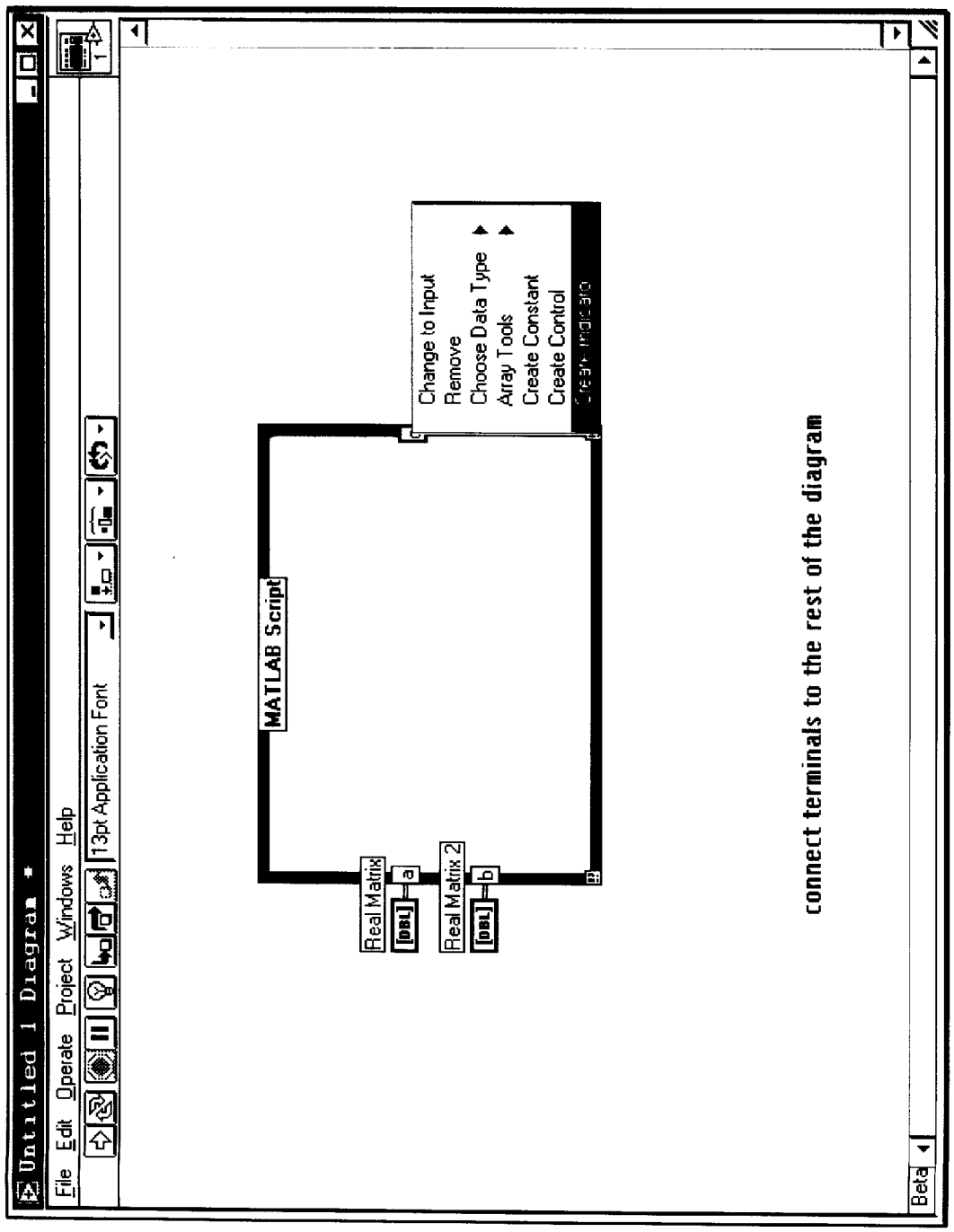
FIG. 12 is a screen shot illustrating the user connecting terminals of the script node to the rest of the diagram.

FIG. 10 is a screen shot illustrating the user adding inputs and/or outputs to the script node. FIG. 11 is a screen shot illustrating the user selecting a data type for inputs and/or outputs of the script node. FIG. 12 is a screen shot illustrating the user connecting terminals of the script node to the rest of the diagram.

In step 310 the user creates or selects code (source code), e.g., a script, for the code node. For example, in one embodiment, the user can simply enter code or a script into the code node. For example, the user can simply type C, C++, or Java code (or other types of textual code), directly into the node to perform any desired task. Also, for example, the user can directly type a HiQ script or a MatLab script, among others, directly into the node. The user enters the code or script using an input device, such as a keyboard, mouse, or using speech recognition. Alternatively, or in addition, the user can select an import feature to import source code from another source, e.g., from a file on the computer, into the code node. In this instance, the user preferably right clicks on the code node and selects an "import code" feature. This causes textual source code to be imported from another source and inserted directly into the code node. After being input by the user or being imported, the code is viewable or displayed in the code node and is also user editable in the code node. The user is thus able to immediately view the code entered into the code node for easy debugging. It is noted that step 310 may be performed before step 308, as desired.

Figure 13:
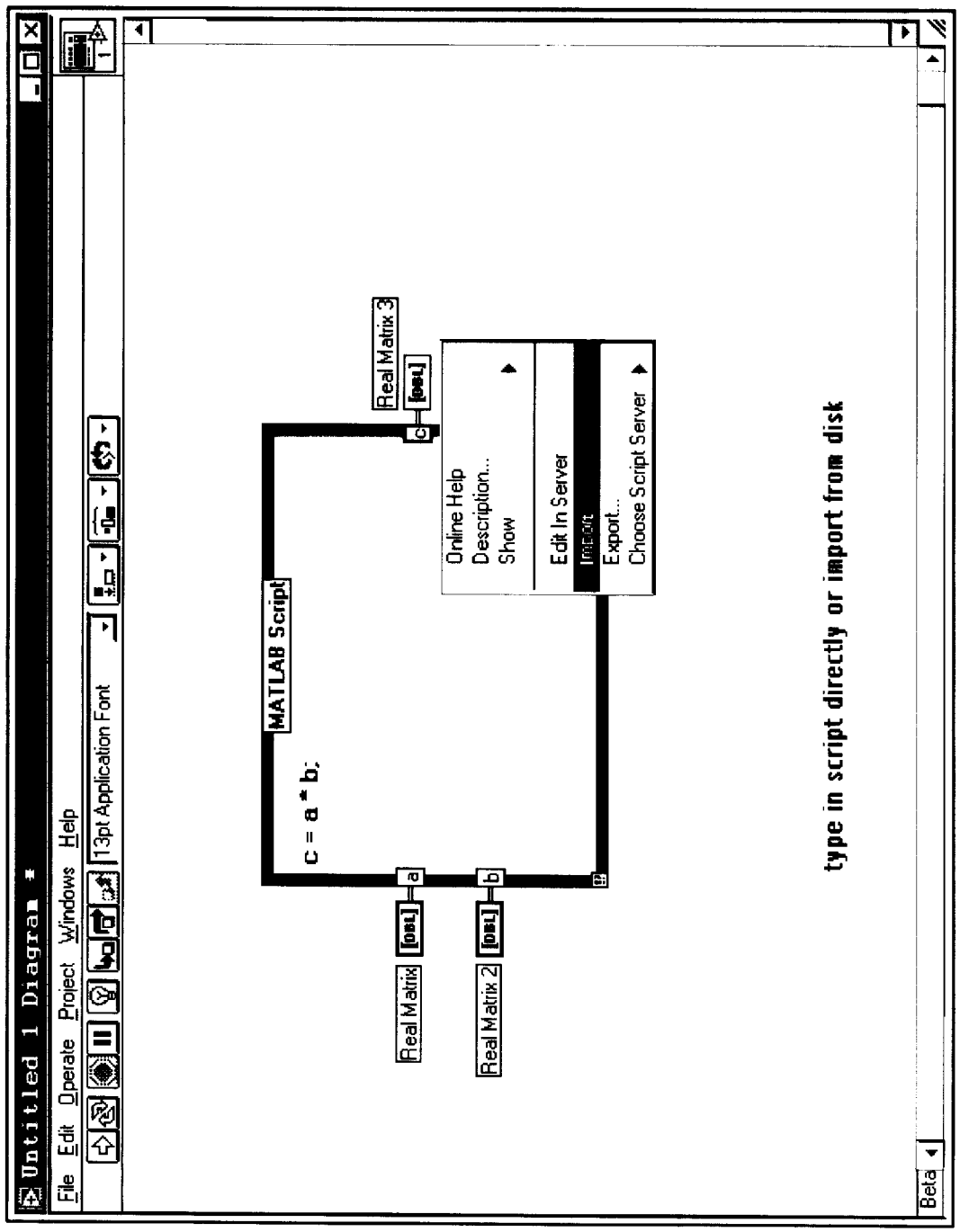
FIG. 13 is a screen shot illustrating a user typing in code, such as a script, into the script node, as well as the user importing code from another source.

FIG. 13 is a screen shot illustrating the user typing a script directly into the code node and/or importing code, e.g., a script, from another source. In FIG. 13, the user has typed in the script: "c=a * b;" directly into the code node. Also, FIG. 13 illustrates the user selecting an "Import . . . " feature to import code into the code node.

In step 312 the user optionally tests the code node. In this embodiment, when the user selects the option to test the code node, a window "pops up" which enables the user to edit, compile and run the code or script directly from an application (the server program) to ensure that the code or script behaves properly. For example, if the code comprised in the code node is a HiQ script, the user selection of the test option enables the user to edit, compile and run the script directly from the HiQ application to ensure that it behaves properly. Similarly, if the code node comprises a MatLab script, user selection of this option allows the user to edit, compile and run the MatLab script directly from the MatLab application to ensure proper behavior. If the code node comprises text based code, such as C or C++ code, an appropriate compiler application is launched, such as LabWindows CVI, Visual Basic, Delphi, etc., which enables the user to edit, compile and run the source code directly from the respective application to ensure proper behavior.

In the preferred embodiment, the graphical program comprises a diagram or execution portion and a user interface portion, and the code node is comprised in the diagram portion. Creation of the graphical program thus may also include configuring a user interface to display data input to and/or output from the graphical program. In one embodiment, such as the LabVIEW graphical programming system from National Instruments, the user may separately configure or assemble a user interface panel including user interface nodes, such as dials, switches, charts, graphs, etc. In this embodiment, terminals which correspond to each of the user interface nodes appear in the block diagram and operate to provide or represent data input to/output from the block diagram. In another embodiment, the user assembles user interface nodes into the block diagram with the function nodes, wherein the user interface nodes have associated user interface elements, such as dials, sliders, text boxes, graphs, charts, etc. The user may then selectively view the user interface elements associated with each of the user interface nodes, such as in Hewlett Packard's VEE product. Alternatively, the user interface panel is automatically constructed from the user interface nodes in the block diagram, such as in the Visual Designer product from Intelligent Instrumentation.

Once the graphical program has been created, then the graphical program may then be compiled into machine language instructions for execution. The graphical program may also be interpreted, as desired. In the preferred embodiment, when the user selects "run", the graphical program is compiled into machine language instructions and the machine language instructions are then executed.

As shown, during compilation, in step 342 the system/method constructs execution instructions in response to the graphical program. This includes constructing execution instructions corresponding to the code node in the graphical program.

In step 344 the system/method initiates a new instance of the code server for the corresponding program or application also referred to as the server program. For example, where the code comprised in the code node is a HiQ script, then the system/method initiates a new instance of the HiQ server. Where the code comprised in the code node is a MatLab script, then the system/method initiates a new instance of the MatLab server. Step 344 may be performed before, during or after the compilation process. Where the code comprised in the code node is textual code such as Perl, Mathematica, Java, etc., then the system/method initiates a new instance of an execution program, such as Perl, Mathematica, or Java, respectively. The code comprised in the code node may also comprise textual code such as C, C++, Pascal, Fortran, Cobol, etc., and the corresponding application may be an interpreter, or a program such as Visual Basic, LabWindows CVI, Delphi, etc.

After compilation of the graphical program, the graphical program is then executed. FIG. 5 illustrates execution of the code node in the graphical program. during execution of the graphical program, the code node is operable to execute, or invoke execution of, the code comprised in the code node. FIG. 5 includes references to the DLL API for certain of the steps, indicating the API calls which are made by the code node to execute certain of the steps in the flowchart of FIG. 5.

As shown, in step 362 the method obtains data input to terminals of the code node and provides this data input to the server instance. Thus, the data input provided to terminals of the code node are provided to the server instance created in step 344 of FIG. 4. This is performed using a "Set Value" command to the API.

In step 364 the method obtains code comprised within the code node of the graphical program and provides this code to the server instance. Thus, in contrast to the prior art code interface node, the code node actually includes the code or script contained within the node which is to be executed. In step 364 this code or script is provided to the server instance. As shown, this code or script is provided using a "Set Code" command to the API.

In step 366 the server instance executes the code using the input data. Thus, in the case of a HiQ script, the HiQ instance executes the HiQ script using the input data provided to the code node. In the case of a MatLab script, the MatLab instance executes the MatLab script using the input data to the code node. In the case of other types of textual code such as Perl, Mathematica, Java, etc., the respective application program instance executes the code using the input data received by the code node. Where the graphical programming system includes the inherent ability to execute a type of textual code, then a separate server program instance may not be required. As shown, step 366 is invoked in response to an "Execute Code" call to the API.

In step 368 the server instance returns the output data. In other words, execution of the code in step 366 causes the server instance to return output data based on execution of the code and the input data received. As shown, the graphical program operates to obtain the output data returned by the server using a "Get Value" command to the API.

In step 370 the graphical programmer receives and uses the output data, again in response to the Get Value command. This output data is used in the graphical program. For example, where the code node includes an output which is connected to inputs of one or more other nodes, the output data is provided to these one or more other nodes for further processing. If the code node includes an output which is connected to an output indicator, such as through a terminal on the diagram, then the output is displayed on the output indicator.

In step 372, after completion of the graphical program, the server instance is released, as it is no longer needed.

Figure 14:
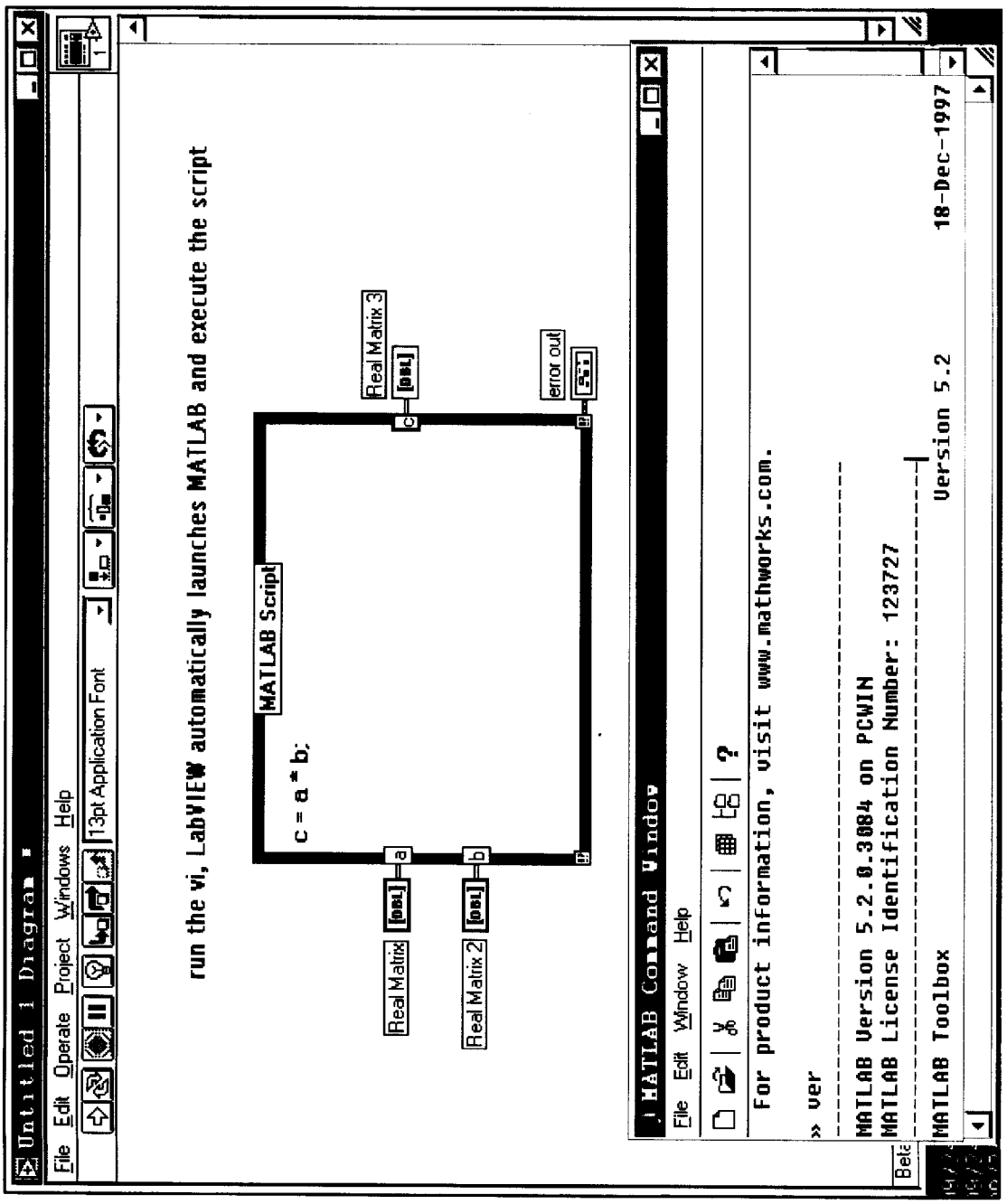
FIG. 14 is a screen shot illustrating execution of a graphical program including a MatLab script node.

FIG. 14 is a screen shot illustrating execution of the graphical program or VI, wherein the graphical programming system automatically launches the server program, e.g., MatLab, and executes the script comprised within the code node.

Figure 6:
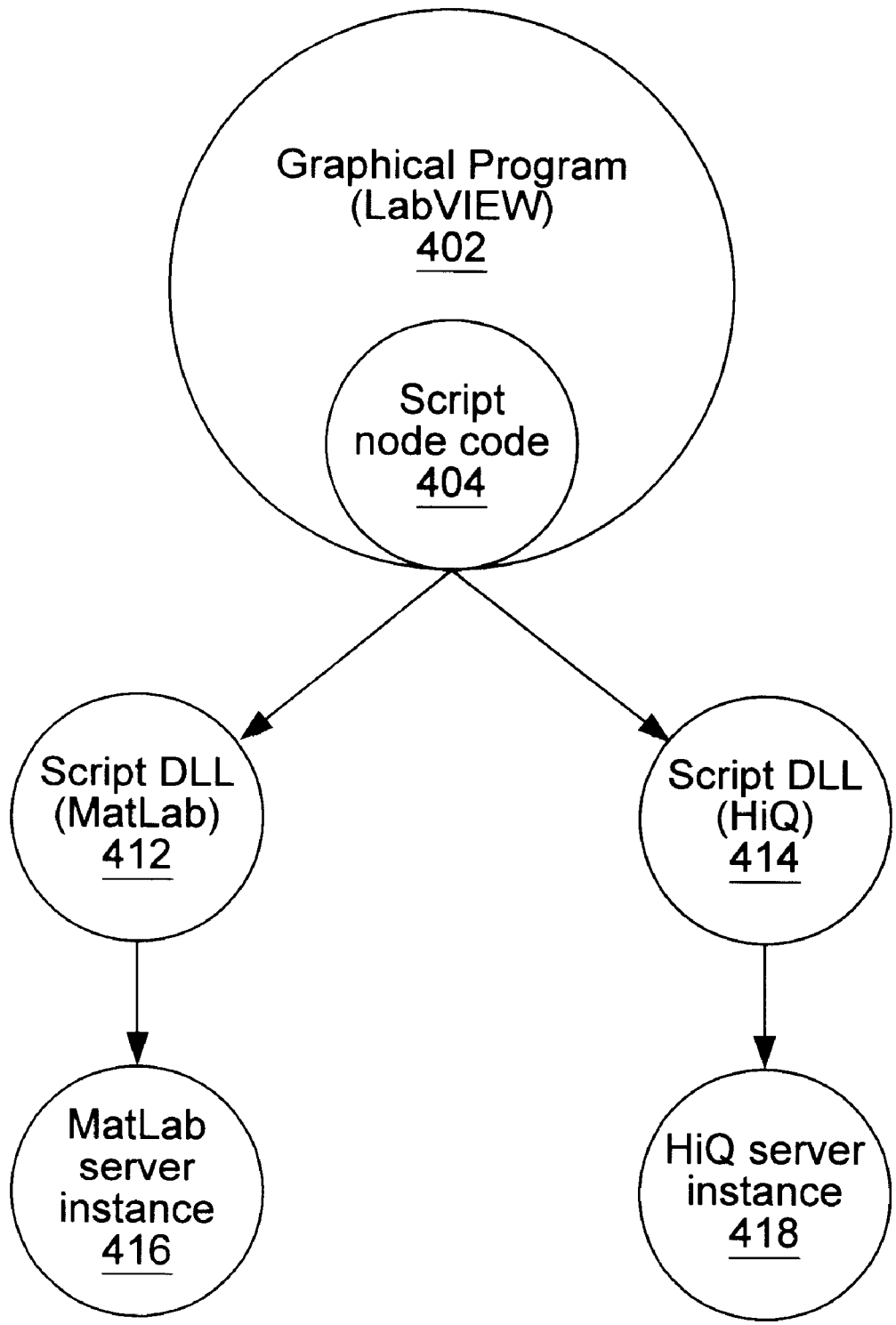
FIG. 6 illustrates the relationship of the graphical programming system and the various DLLs.
Figure 7:
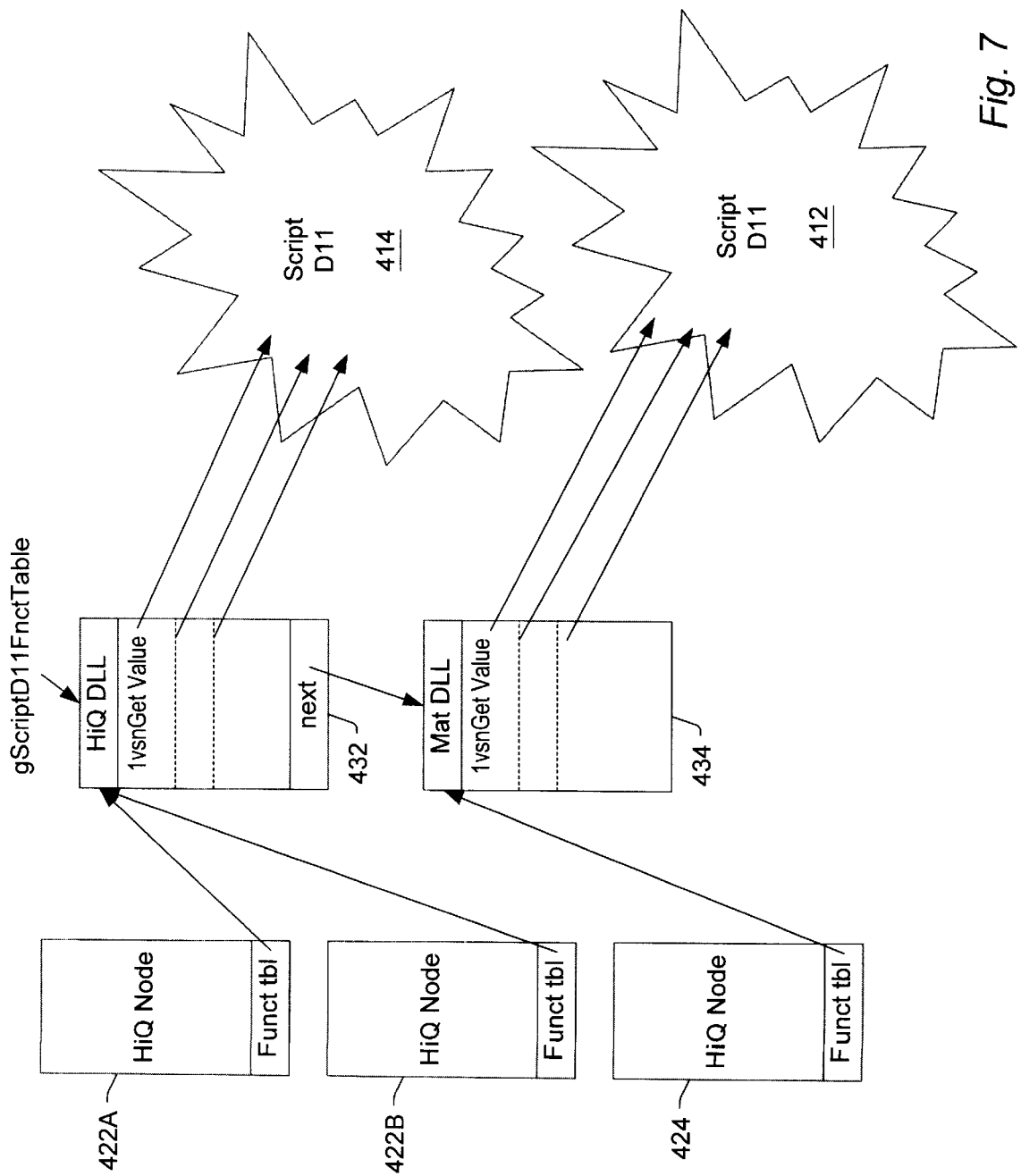
FIG. 7 is a more detailed diagram illustrating how code nodes access the various DLLs.

FIGS. 6 and 7—Script Node Operation

The following description describes the current embodiment, where the code node executes scripts and is referred to as a script node. In this current embodiment, two possible types of script nodes include a HiQ script node and a MatLab script node. Also, in the current embodiment described below, the graphical programming system is referred to as the LabVIEW graphical programming system.

The present embodiment includes a standard interface or API used for the code node (or script node) to communicate with respective server programs. Each possible server program has an associated DLL which implements or executes API calls to the respective server program. The code node in the graphical programming system communicates with the respective DLL corresponding to the respective server program. More specifically, the code node in the graphical programming system makes calls to the API, which are received and executed by the respective DLL. The DLL communicates with the respective server program in response to calls received from the graphical programming system. In the preferred embodiment, each respective code node or script node has an associated DLL which is specific to the respective script node.

The standard API, also called the DLL API, includes calls such as Get Script, Set Script, Get Value, Set Value, and Execute, among others. The API thus performs tasks such as launching the script engine, setting or getting script text or variables, and running the script. The API is designed to resemble the general APIs of script engines that communicate with the graphical programming system.

As shown in FIG. 6, in the current embodiment, which allows HiQ and MatLab scripts, the embodiment includes a MatLab script DLL 412 and a HiQ script DLL 414. The graphical programming system 402, e.g., LabVIEW, includes code, referred to as script node code 404, which makes calls to the appropriate DLL 412 or 414, depending on the type of script node being used. The MatLab script DLL 412 in turn communicates with an instance of the MatLab program 416, which executes the MatLab script. The HiQ script DLL 414 in turn communicates with an instance of the HiQ program 418 which executes the HiQ script.

The standard API enables future types of code or scripts to be easily implemented within the graphical programming system. In order to implement a new type of code or script, the developer adds a new DLL for the respective server program, wherein the new DLL implements the standard interface for the server program. DLLs for each of the server programs are placed in a directory which is available to the graphical programming system.

As described above, when the code node is dropped, the graphical programming system loads the appropriate DLL for the server program. More specifically, when a specific code node or script node is selected from the function palette by the user, the graphical programming system receives the object class and also receives an index into the resource string. From this index, the graphical programming system obtains the script server identification and the name of the DLL to load. Handles to the DLL are stored in a global array (FIG. 7). Once the handles are loaded, pointers to DLL functions are also cached. During initialization time, each script node preferably sets up its DLL function pointer for later use.

The run time code of the script node is a C function which comprises three parts: convert and copy input data to the script server; execute the script; and receive and convert output data into LabVIEW.

The new server instance of the server program is not initialized until compile time as described above with reference to FIG. 4. Thus the user may notice a small amount of delay during compile time, due to the requirement of launching an instance of the server program. The server handle is maintained until the next compile. When a recompile is performed, the server handle is disposed of and another handle is reinitialized.

FIG. 7 is a more detailed diagram illustrating the operation of a script node making calls to the appropriate DLL to invoke execution of a script or code according to the present invention. FIG. 7 illustrates two HiQ script nodes 422A and 422B, and a MatLab script node 424. As shown, each script node 422 and 424 includes a Function Table, referred to as "Fnct tbl" in FIG. 7, which references a structure 432 or 434 comprising an array of handles. The array of handles in turn references the appropriate DLL 412 or 414.

A global variable gScriptDllFnctTable points to the first structure 432, and the first structure 432 includes a pointer to the next structure 434 in a linked list fashion. The entries in the structure 432 and 434 contain handles of the DLL, a reference count, a mutex, the name of the script server and an array of DLL function pointers. Since the function palette menu contains the script node, this information is available during LabVIEW initialization time to dynamically allocate the array. Every script node, during the initialization time, checks this list to see if its script DLL has already been loaded. If so, then the script node sets its table pointer to that shared "function pointer bank" and increases the reference count. The dispose method for every script node will decrement the count, and the DLL is removed from memory if count is zero. The instance handle to the script server is kept inside every node.

Some script servers are multi-client, i.e., are multi-threaded, which means all clients share variables. To guarantee the integrity of script execution, the script DLL uses a mutex to protect DLL function calls.

The following code describes the structures 432 and 434 used by the script code within LabVIEW to access the appropriate DLL.

```
enum{
    klvsnImplementsVersion,
    klvsnFirstImplementedVersion,
    ...
    klvsnEnumOutputs,
    klvsnNFunctions
}
typedef struct{
    Int32 refcount;
    HINSTANCE dllHandle;
    Mutex scriptRight;
    CStr scriptName;
    Void *dllFnct[klvsnNFunctions];
} ScriptDllFnctTab;
typdef struct{
    Int32 nEntries;
    ScriptDllFnctTab dllFnct[1];
} ScriptDllFnctArray;
ScriptDllFnctArray gScriptDllFnct;
```

DLL Interface

The DLL Interface is as follows. It is noted that portions of the DLL interface may not be able to be implemented for a specific script server.

int lvsnImplementsVersion(unsigned int version);

unsigned int lvsnFirstImplementedVersion(void);

unsigned int lvsnLastImplementedVersion(void);

lvsInstance lvsnInitNew(unsigned int version);

void lvsnCleanup(lvsnInstance instance);

int lvsnSetScript(lvsnInstance instance, const char* text);

int lvsnGetScript(lvsnInstance instance, char* buffer, int bufLength);

int lvsnEditScript(lvsnInstance instance, HANDLE event, HWND parent);

void lvsnFinishEdit(lvsnInstance instance);

int lvsnCompile(lvsnInstance instance, unsigned int* errorBegin, unsigned int* errorEnd, char* messageBuffer);

int lvsnExecute(lvsnInstance instance, unsigned int* errorBegin, unsigned int* errorEnd, char* messageBuffer);

int lvsnSetValue(lvsnInstance instance, const char* varName, const VARIANT* value);

int lvsnGetValue(lvsnInstance instance, const char* varName, VARIINT* value);

const char* lvsnGetScriptName(void);

lvsnDebugState lvsnDebugInit(lvsnInstance instance);

int lvsnDebugStep(lvsnInstance instance, lvsnDebugState debugState, int how, int* errorBegin, int* errorEnd, char* messageBuffer);

void lvsnDebugCleanup(lvsnInstance instance, lvsnDebugState debugstate);

int lvsnEnumInputs(lvsnInstance instance, lvsnEnumVariablesCallback func, lvsnEnumVariablesData funcData);

int lvsnEnumOutputs(lvsnInstance instance, lvsnEnumVariablesCallback func, lvsnEnumVariablesData funcData);

Data Conversion between LabVIEW and the program server

A type conflict error will be returned if data conversion between the graphical programming system and the prograrn server fails. The implementation includes straight forward, conversion, atray dimension change and extraction at the OLE variant level. Existing OLE variant functions are preferably used for the script node. The DLL includes two data conversion functions:

void lvsnRecommendTypes(Int32 *ne, Int16** td);/* this function is added to the dll for this purpose */

MgErr lvsnSetVariable(lvsnInstance instance, char* varName, int32 dsOffset, int16* tdOffset);

MgErr lvsnGetVariable(lvsnInstance instance, char* varName, int32 dsOffset, int16* tdOffset);

During compile time (code generation time), the graphical programming system builds a table containing the dataspace and type descriptor offset of all the input and output terminals. The table is located in the data space.

The offset of this table is passed to the run time routine.

```
typedef struct {
  CStr vName;
  Int32 dsOffset;
  Int32 tdOffset;
  Int32 flag; /*input or output*/
} ScriptNodeTermEntry;
typedef struct{
  int32 nEntry;
}
ScriptNodeTermEntry scriptTerms[1];
```

The run time routine comprises three sections: copy variable to script, execute script, copy output variable back to LabVIEW. The run time routine returns a non-zero value if an error occurs. A routine called GenErrorHandling is compiled into the code to check the return value of the script node run time routine.

EMBODIMENTS OF THE INVENTION

The following discusses various embodiments of the present invention for the HiQ and Matab software programs. Both HiQ and MatLab include scripting languages for creating scripts. In this description, the code node is referred to as a script node.

HiQ and MATLAB are software programs that enable a user to organize and visualize real-world math, science, and engineering problems. HiQ and MATLAB can be used to express numeric formulas elegantly. The present invention may be used to enable a user to load and edit HiQ and MATLAB scripts into graphical program or block diagram code so that the graphical program works with their advanced mathematics functionality. In the following description, the graphical programming system is the LabVIEW graphical programming system.

The currently implemented embodiment includes a HiQ script node and a MATLAB script node. The HiQ script node and the MATLAB script node may be found in the Functions>>Mathematics>>Formula palette, as shown in FIG. 8. The user can place a script node on his/her block diagram and enter a script according to the syntax of HiQ or MATLAB. LabVIEW then communicates with that script server engine as described above. When inputs and outputs are created on the script node, those values are passed between HiQ or MATLAB and LabVIEW. If a script is already written, the script can be imported from HiQ or MATLAB, as discussed below.

The script node supports the same HiQ or MATLAB data types as supported by ActiveX. Because of the nature of the HiQ and MATLAB script languages, the user must choose which LabVIEW data type each terminal should be. This is discussed further below. The following two sections, titled "Creating a HiQ Script" and "Creating a MATLAB Script", describe an example for creating a script that does the following:

Generates a matrix of random values;

Plots that information to a graph;

Displays the graph in either product; and

Presents the generated random values on the front panel in LabVIEW.

Creating a HiQ Script

The following instructions are performed to create and run a VI that uses a HiQ script.

From the block diagram, the user chooses Functions>>Mathematics>>Formula>>HiQ-Script. The user then places the node on the block diagram and sizes it according to the amount of script desired to include in the window.

With the operating tool, the user enters the script in the HiQ script node. For example, the following simple HiQ script creates a matrix of random values, plots that information to a graph, and displays the matrix in HiQ.

a=random({50, 50});

g=createGraph(a);

createview(g, true);

As noted above, the user may also import a script from an external source.

A HiQ script window may be used to edit, compile, and run the script directly from HiQ to ensure that the script behaves properly. In order to use a HiQ script window for this purpose, the user right-clicks the HiQ script node and selects "Edit In Server". This action launches HiQ, and a script window appears containing the HiQ script. Within HiQ, the user right-clicks and chooses compile from the pop-up menu. A message window appears telling the user of any compile time errors. The user is not required to compile the script explicitly; HiQ compiles the script automatically when it is run. The user then right-clicks and chooses Run from the pop-up menu. A message window informs the user of any runtime errors.

To access HiQ context-sensitive online help, the user places the cursor inside any function and presses<F1>. This information can be used to help the user build a script.

The user closes the HiQ window to update and return to the HiQ script node on the LabVIEW block diagram.

In order to add inputs and outputs for variables, the user right-clicks the right side of the node frame and selects "Add Input" or "Add Output". The user types in "a" to add an output for the "a" variable that is included in the HiQ script. By default, the node already includes one input and one output terminal for the error in and error out parameters.

The user then should verify the data type of the inputs and/or outputs. The error-checking input and output are already the correct data type. In HiQ, the default data type for any new input or output is Real. The user right-clicks the "a" output and selects Choose Type. From the submenu that appears, the user selects an available data type: Integer, Real, Complex, Text, Integer Vector, Real Vector, Complex Vector, Integer Matrix, Real Matrix, and Complex Matrix. For the "a", output, Real Matrix is chosen for this example.

The user then creates controls and indicators for each input and output. The user right-clicks the "a", output terminal and selects "Create Indicator". The user right-clicks the error out output terminal and selects "Create Indicator". Indicators for "a" and "error out" appear on the front panel, and terminals appear wired to these outputs on the block diagram.

The user then selects the front panel for viewing and resizes his/her "a", indicator to see the generated numbers when the VI is run.

When the user runs the VI, LabVIEW launches HiQ and a new HiQ window appears that displays the matrix. The values that make up this matrix are displayed in the "a", indicator of the front panel in LabVIEW.

The second parameter in the CreateView function (of the HiQ script) specifies whether to pause execution of the HiQ script while the view is visible. The HiQ script does not finish until the user clicks the Continue button in the HiQ window to dismiss the view.

The user can change the true parameter to false and re-run the VI to see the difference.

Creating a MATLAB Script

The following instructions are performed to create and run a VI that uses a MATLAB script.

From the block diagram, the user chooses Functions>>Mathematics>>Formula>>MATLAB Script. The user places the node on the block diagram, and sizes it according to the amount of script desired to include in the window. The MATLAB script node appears as shown in FIG. 9.

With the operating tool, the user enters a script in the MATLAB script node. For example, the following simple MATLAB script creates a matrix of random values, plots that information to a graph, and displays the matrix in MATLAB.

a=rand(50)

surf(a)

As noted above, the user may also import a script from an external source.

To add inputs and outputs for variables, the user right-clicks the right side of the node frame and selects "Add Input" or "Add Output". The user types in "a" to add an output for the "a" variable that is included in the MATLAB script. By default the script node already includes one input and one output terminal for the error in and error out parameters.

The user then verifies the data type of the inputs and/or outputs. The error-checking input and output are already the correct data type. In MATLAB, the default data type for any new input or output is Real. The user right-clicks the "a" output and selects Choose Type. From the submenu that appears, the user selects an available data type: Real, Complex, Real Vector, Complex Vector, Real Matrix, or Complex Matrix. For the "a" output, the user selects Real Matrix for this example.

The user then creates controls and indicators for each input and output. The user right-clicks the "a" output terminal and selects Create Indicator. The user right-clicks the "error out" output terminal and selects "Create Indicator". Indicators for "a" and "error out" appear on the front panel, and terminals appear wired to these outputs on the block diagram.

The user then selects the front panel for viewing, and resizes the "a" indicator to see the generated numbers when the VI is run.

When the VI is run, LabVIEW launches MATLAB and a new MATLAB window appears that displays the matrix. The values that make up this matrix are displayed in the "a" indicator of the front panel in LabVIEW.

Importing or Exporting a Script

In the currently implemented embodiment, the following steps are executed to import a script into a script node in LabVIEW.

1. Right-click the HiQ or MATLAB script node.
2. Select "Import . . . ".
3. Choose the file desired to be imported and click Open. The script text appears in the node and is editable by the user.

In the currently implemented embodiment, the following steps are executed to export a script to LabVIEW from MATLAB or HiQ.

1. Right-click the HiQ or MATLAB script node.
2. Select "Export . . . ". The Save Script as dialog box appears.
3. Enter the desired name to save the file as, or choose the file desired to be overwritten.
4. Click Save.

HiQ and MATLAB script files are actually text files. Text files usually have the extension .txt. However, HiQ files have a .hqs extension and MATLAB files have a .m extension.

Choosing a Script Server

In the currently implemented embodiment, the following steps are executed to change the server behind the script node.

1. Right-click the HiQ or MATLAB script node.
2. Select "Choose Script Server>>HiQ-Script" or "Choose Script Server>>MATLAB Script" depending on whether HiQ or MATLAB is desired.

Some data types in HiQ are not recognized by MATLAB and vice versa. If the script server is changed from one of these mathematics products to the other after data types have been assigned, these data types do not change automatically. The VI will be broken. When the broken arrow is selected or clicked in the toolbar of the VI, the "Error List" window reports these incorrect data types.

Scrolling through a HiQ or MATLAB Script

The user can display a scrollbar within the script node by right-clicking the node and selecting "Show>>Scrollbar". A scrollbar appears on the right side of the script node.

Configuring the Data Type of a Terminal

Both HiQ and MATLAB are loosely typed script languages and do not determine the data type of a variable until after the script executes. Therefore LabVIEW cannot determine a variable's type in Edit mode. However, LabVIEW does query the script server to find out possible data types, and allows the user to choose which LabVIEW data type each terminal should be.

If the user does not correctly configure a variable's data type, LabVIEW will produce either an error or incorrect information at runtime.

In the currently implemented embodiment, the following steps are executed to change the data type of an input or output terminal on a script node.

1. Right-click the terminal of the input or output. A pop-up menu appears.
2. Select "Choose Type". A list of the available data types appears, depending on whether HiQ or MATLAB is used.
3. Choose the preferred data type.

LabVIEW recognizes all the data types that HiQ and MATLAB can use, although they might be named differently.

The table of FIG. 15 shows LabVIEW data types and their corresponding data types in HiQ and MATLAB.

Debugging a HiQ or MATLAB Script

In the currently implemented embodiment, the following programming techniques can be used to allow easier user debugging.

First, the user can write his/her script and run it within the native engine (e.g., HiQ or MATLAB) for testing and debugging purposes before the script is imported into LabVIEW. In HiQ, the user right-clicks the script node and selects "Edit In Server" to debug in a native HiQ script window.

The user should also verify data types. When a new input or output is created, the user should make sure that the data type of the terminal is correct. Also, controls and indicators for inputs and outputs should be created to enable monitoring of what values are being passed between LabVIEW and the native engine.

The error-checking parameters can be used for debugging information. An indicator for the error out terminal on a script node can be created before any VI is run. This allows the user to view the generated error information at runtime.

Error Codes

The following table explains error messages the user may receive at runtime when working with a script node.

| Error Code | Error Code Message | Description |
|---|---|---|
| 1046 | edScriptCantInitServer | LabVIEW failed to initiate a new session with the server. |
| 1047 | edScriptCantSetValue | LabVIEW failed to set the value of a variable to the server. |
| 1048 | edScriptCantGetValue | LabVIEW failed to retrieve the value of a variable from the server. |
| 1049 | edScriptCantSetScript | LabVIEW failed to set a script to the server. |
| 1050 | edScriptExecError | LabVIEW encountered an execution problem. The server returns a string to report the problem. |

Advantageously, the graphical system and method of the present invention, which enables a combination of graphical programming and text-based programming, has a number of benefits. The code node of the present invention allows the user to directly view and edit textual source code from within a graphical program and invoke execution of the code during execution of the graphical program. The benefits include a reduction in the development time required to create a program, as well as a reduction of the number of code defects in the program. Yet another benefit is the simplicity of graphical programming, combined with the ability to incorporate and/or use existing or newly created text code in an easy to use format.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for creating a graphical program, wherein the graphical program is operable to invoke execution of textual code, wherein the method for creating the graphical program operates in a computer including a display screen and a user input device, the method for creating the graphical program comprising:
    displaying on the screen a code node in the graphical program in response to user input;
    displaying on the screen textual code comprised in the code node in response to user input, wherein the code node is operable to invoke execution of the textual code comprised in the code node; and
    executing the graphical program, wherein said code node invokes execution of said textual code during said executing.

2. The computer-implemented method of claim 1, further comprising:
    editing the textual code comprised in the code node in response to user input prior to said executing the graphical program.

3. The computer-implemented method of claim 1, wherein said displaying on the screen the textual code comprised in the code node comprises importing a textual code file into the code node.

4. The computer-implemented method of claim 1, wherein said displaying on the screen the textual code comprised in the code node comprises receiving user input to manually enter the textual code into the code node.

5. The computer-implemented method of claim 1, further comprising:
    initiating an instance of a server program, wherein the server program is operable to execute the textual code comprised in the code node;

wherein, during said executing the graphical program, said instance of the server program operates to execute the textual code comprised in the code node.

6. The computer-implemented method of claim 5, wherein said executing the graphical program includes:
the graphical program providing the textual code to the instance of the server program;
the instance of the server program executing the textual code, wherein said executing the textual code produces an output; and
the instance of the server program providing the output to the graphical program;
wherein the output is used during execution of the graphical program.

7. The computer-implemented method of claim 5, wherein the code node is connected to receive inputs from one or more first nodes in the graphical program; wherein said executing the graphical program includes:
the one or more first nodes generating a first data output which is provided as a first data input to the code node;
the graphical program providing the textual code and the first data input to the instance of the server program;
the instance of the server program executing the textual code, wherein the instance of the server program uses the first data input in executing the textual code, wherein said executing the textual code produces a server program output; and
the instance of the server program providing the server program output to the graphical program;
wherein the server program output is used during execution of the graphical program.

8. The computer-implemented method of claim 5,
releasing the instance of the server program upon completion of the graphical program.

9. The computer-implemented method of claim 1, further comprising:
determining a type of the code node in response to said displaying on the screen the code node in the graphical program;
initiating an instance of a server program, wherein the server program is operable to execute the textual code comprised in the code node, wherein the server program is selected based on the type of the code node;
wherein, during said executing the graphical program, said instance of the server program operates to execute the textual code comprised in the code node.

10. The computer-implemented method of claim 9, wherein the textual code comprises a script from a scripting language;
wherein the code node is a script node selected from a plurality of script nodes;
wherein said determining the type of the code node comprises determining the type of the script node;
wherein said selecting the server program includes selecting a scripting program based on the type of the script node.

11. The computer-implemented method of claim 1, wherein the textual code comprises a script from a scripting language.

12. The computer-implemented method of claim 1, wherein the graphical program comprises a plurality of nodes, wherein the method for creating the graphical program further comprises:
arranging on the screen said plurality of nodes, including said code node, to create the graphical program.

13. The computer-implemented method of claim 12, wherein the method creates a graphical data flow program wherein the method for creating the graphical program further comprises:
connecting said plurality of nodes and said code node in response to user input, wherein said connecting includes connecting said plurality of nodes and said code node to provide data flow between said plurality of nodes and said code node.

14. The computer-implemented method of claim 1, wherein the method for creating the graphical program further comprises:
displaying on the screen a user interface panel in response to user input for displaying data input to and/or output from the graphical program.

15. The computer-implemented method of claim 1, further comprising:
constructing execution instructions in response to said graphical program; and
executing said execution instructions, wherein said code node invokes execution of said textual code during said executing.

16. A computer-implemented method for creating a graphical program, wherein the graphical program is operable to invoke execution of textual code, wherein the method for creating the graphical program operates in a computer including a display screen and a user input device, the method for creating the graphical program comprising:
displaying on the screen a code node in the graphical program in response to user input;
displaying on the screen textual code comprised in the code node in response to user input, wherein the code node is operable to invoke execution of the textual code comprised in the code node, wherein the textual code is executable by a server program;
connecting the code node to receive inputs from one or more first nodes in the graphical program; and
executing the graphical program, wherein said code node invokes execution of said textual code during said executing, wherein said executing the graphical program includes:
the one or more first nodes generating a first data output which is provided as a first data input to the code node;
the graphical program providing the textual code to the server program;
the graphical program providing the fist data input to the server program;
the server program executing the textual code, wherein the server program uses the first data input in executing the textual code, wherein said executing the textual code produces a server program output; and
the server program providing the server program output to the graphical program;
wherein the server program output is used during execution of the graphical program.

17. The computer-implemented method of claim 16, further comprising:
editing the textual code comprised in the code node in response to user input prior to said executing the graphical program.

18. A memory medium comprising program instructions for creating a graphical program, wherein the graphical program is operable to invoke execution of textual code, wherein the graphical program operates in a computer including a display screen and a user input device, wherein the program instructions are executable to implement:

displaying on the screen a code node in the graphical program in response to user input;

displaying on the screen textual code comprised in the code node in response to user input, wherein the code node is operable to invoke execution of the textual code comprised in the code node; and executing the graphical program, wherein said code node invokes execution of said textual code during said executing.

19. The memory medium of claim 18, wherein the textual code comprised in the code node is user editable.

20. The memory medium of claim 18, wherein said displaying on the screen the textual code comprised in the code node comprises one of: importing a textual code file into the code node; or receiving user input to manually enter the textual code into the code node.

21. The memory medium of claim 18, further comprising:

initiating an instance of a server program, wherein the server program is operable to execute the textual code comprised in the code node;

wherein, during said executing the graphical program, said instance of the server program operates to execute the textual code comprised in the code node.

22. The memory medium of claim 21, wherein said executing the graphical program includes:

the graphical program providing the textual code to the instance of the server program;

the instance of the server program executing the textual code, wherein said executing the textual code produces an output; and the instance of the server program providing the output to the graphical program;

wherein the output is used during execution of the graphical program.

23. The memory medium of claim 21, wherein the code node is connected to receive inputs from one or more first nodes in the graphical program; wherein said executing the graphical program includes:

the one or more first nodes generating a first data output which is provided as a first data input to the code node;

the graphical program providing the textual code to the instance of the server program;

the graphical program providing the first data input to the instance of the server program;

the instance of the server program executing the textual code, wherein the instance of the server program uses the first data input in executing the textual code, wherein said executing the textual code produces a server program output; and the instance of the server program providing the server program output to the graphical program;

wherein the server program output is used during execution of the graphical program.

24. A computer system for creating and executing a graphical program, wherein the graphical program is operable to invoke execution of textual code, the computer system comprising:

a display screen for displaying a graphical program;

a user input device for receiving user input;

a CPU; and a memory, wherein the memory stores a graphical programring system which is executable by the CPU for creating the graphical program;

wherein, in response to CPU execution of the graphical programming system, the computer system is operable to:

display on the screen a code node in the graphical program in response to user input;

display on the screen textual code comprised in the code node in response to user input, wherein the code node is operable to invoke execution of the textual code comprised in the code node; and execute the graphical program, wherein the code node invokes execution of said textual code during execution of the graphical program.

25. The computer system of claim 24, wherein the textual code comprised in the code node is user editable.

26. The computer system of claim 24, wherein the memory further stores a server program, wherein the server program is operable to execute the textual code comprised in the code node;

wherein, during execution of the graphical program, an instance of the server program operates to execute the textual code comprised in the code node.

27. The computer system of claim 26, wherein, in executing the graphical program, the graphical program is operable to provide the textual code to the instance of the server program;

the instance of the server program is operable to execute the textual code, wherein said executing the textual code produces an output; and the instance of the server program is operable to provide the output to the graphical program;

wherein the output is used during execution of the graphical program.

28. The computer system of claim 26, wherein the code node is connected to receive inputs from one or more first nodes in the graphical program;

wherein, in executing the graphical program, the one or more first nodes are operable to generate a first data output which is provided as a first data input to the code node;

the graphical program is operable to provide the textual code to the instance of the server program;

the graphical program is operable to provide the first data input to the instance of the server program;

the instance of the server program is operable to execute the textual code, wherein the instance of the server program uses the first data input in executing the textual code, wherein said executing the textual code produces a server program output; and the insance of the server program is operable to provide the server program output to the graphical program;

wherein the server program output is used during execution of the graphical program.

* * * * *

UNITED STATES PATENT AND TRADEMARK OFFICE
CERTIFICATE OF CORRECTION

PATENT NO. : 6,282,699 B1
DATED : August 28, 2001
INVENTOR(S) : Zhang et al.

Page 1 of 1

It is certified that error appears in the above-identified patent and that said Letters Patent is hereby corrected as shown below:

<u>Column 24, claim 24,</u>
Lines 4 and 5, please delete "programring" and substitute -- programming --.

Signed and Sealed this

Twelfth Day of March, 2002

Attest:

JAMES E. ROGAN
*Attesting Officer*     *Director of the United States Patent and Trademark Office*